United States Patent [19]

Pousette

[11] 4,402,353

[45] Sep. 6, 1983

[54] LOG DEBARKER WITH AIR-SEAL COOLING FINS

[75] Inventor: Ronald D. Pousette, Vancouver, Canada

[73] Assignee: Brunette Machine Works, Ltd., New Westminster, Canada

[21] Appl. No.: 309,556

[22] Filed: Oct. 8, 1981

[51] Int. Cl.³ .............................................. B27L 1/00
[52] U.S. Cl. .............................................. 144/208 E
[58] Field of Search ........................ 144/208 R, 208 E

[56] References Cited

U.S. PATENT DOCUMENTS

| | | | |
|---|---|---|---|
| 2,888,966 | 6/1959 | Morgan et al. | 144/208 E |
| 3,137,329 | 6/1964 | Smith | 144/208 E |
| 3,236,273 | 2/1966 | Rich et al. | 144/208 E |
| 3,361,168 | 1/1968 | Brown | 144/208 E |
| 3,667,517 | 6/1972 | Bentley et al. | 144/208 E |

Primary Examiner—W. D. Bray
Attorney, Agent, or Firm—Kolisch, Hartwell & Dickinson

[57] ABSTRACT

An air-seal cooling fin system in a log debarker of the type having a frame, a ring mounted for rotation on the frame, and air-pressure actuated debarking arms carried on the ring. Pressurized air is supplied to the arms through a rotary air seal composed of a stationary seal portion joined to the frame and a rotatable seal portion joined to the ring including a pair of spaced annular elements disposed on axially opposed sides of the stationary portion. Arranged on each of the annular elements in the rotatable seal portion is a circular array of angularly spaced fins. These fins act to radiate heat generated in the seal during debarker operation and interact with a circular array of fins carried on the stationary portion to create cooling air turbulence in the region of the seal.

3 Claims, 4 Drawing Figures

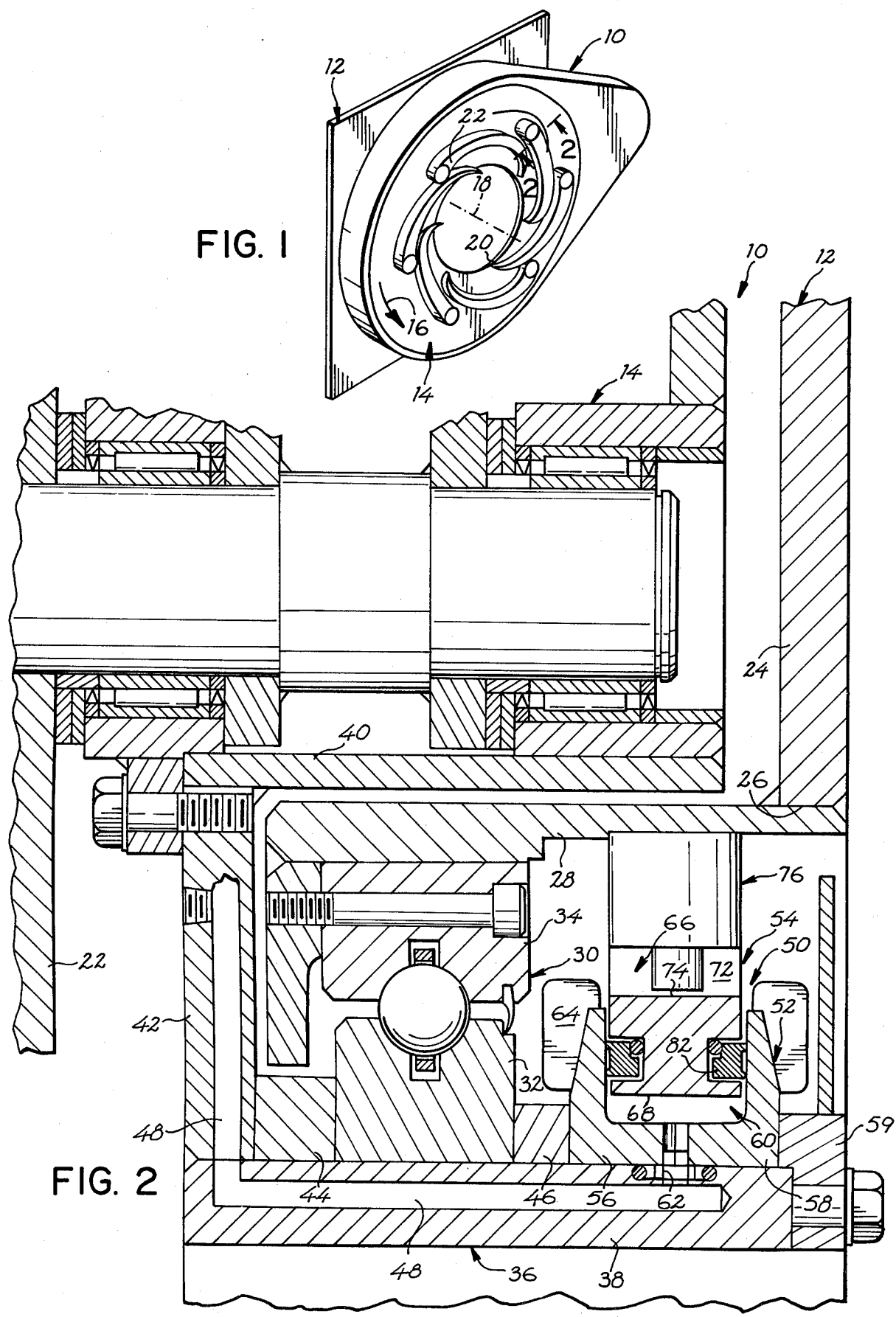

LOG DEBARKER WITH AIR-SEAL COOLING FINS

BACKGROUND AND SUMMARY

The present invention is concerned with a fin system used in cooling a rotary seal in a log debarker and the like.

A common type of log debarker includes a frame, a ring mounted for rotation on the frame, and air-pressure actuated debarking arms carried on the ring. Pressurized air is supplied to the arms through a rotary seal having stationary and rotatable seal portions carried on the frame and on the ring, respectively. In one debarker known in the prior art, the rotatable seal portion is composed of a pair of spaced annular elements defining confronting, annular walls. The stationary seal portion includes a ring structure disposed between the annular elements, and a pair of sealing rings carried on the ring structure and biased against associated annular walls in the annular elements just mentioned. During debarker operation, considerable frictional heat is generated in the seal in the regions of contact between the relatively moving seal parts. The buildup of frictional heat in the seal tends to produce heat stress wear in the seal, degrading the seal and ultimately requiring seal replacement.

One object of the present invention is to provide, in a log debarker and the like, a cooling fin system which substantially reduces heat buildup in a rotary seal of the type described above.

A more specific object is to provide such a system which acts to promote both radiative and turbulent-air heat transfer from such a seal.

Yet another object of the invention is to provide such a system which is compatible with, and can be easily incorporated into, a preexisting log debarker.

A debarker incorporating the cooling fin system of the present invention includes a frame, a ring mounted for rotation on the frame and a rotary air seal including a rotatable seal portion formed by two rotatable seal elements joined to the ring, and a stationary seal portion joined to the frame. Multiple fins in the system are joined to the rotatable seal elements in heat-conductive relation therewith, and to the stationary seal portion, adjacent the fins on the rotatable seal elements. With rotation of the ring relative to the frame, the fins on the seal portions travel relatively past one another to create cooling air turbulence in the region of the seal.

In a preferred embodiment of the invention, fins on the elements are arranged in a pair of spaced, substantially planar arrays, one array on each element. Fins on the stationary portion are arranged in a substantially circular array between the two fin arrays on the annular elements.

These and other objects and features of the present invention will become more fully apparent when the following detailed description of a preferred embodiment of the invention is read in connection with the accompanying drawings.

BRIEF DESCRIPTION OF THE DRAWINGS

FIG. 1 is a simplified perspective view of a portion of a log debarker incorporating the cooling fin system of the present invention;

FIG. 2 is an enlarged sectional view taken generally from the underside of line 2—2 in FIG. 1, which line is contained within a plane which is radial with respect to, and which contains, the axis of rotation of the ring in the debarker;

DETAILED DESCRIPTION OF A PREFERRED EMBODIMENT OF THE INVENTION

Figure 3:
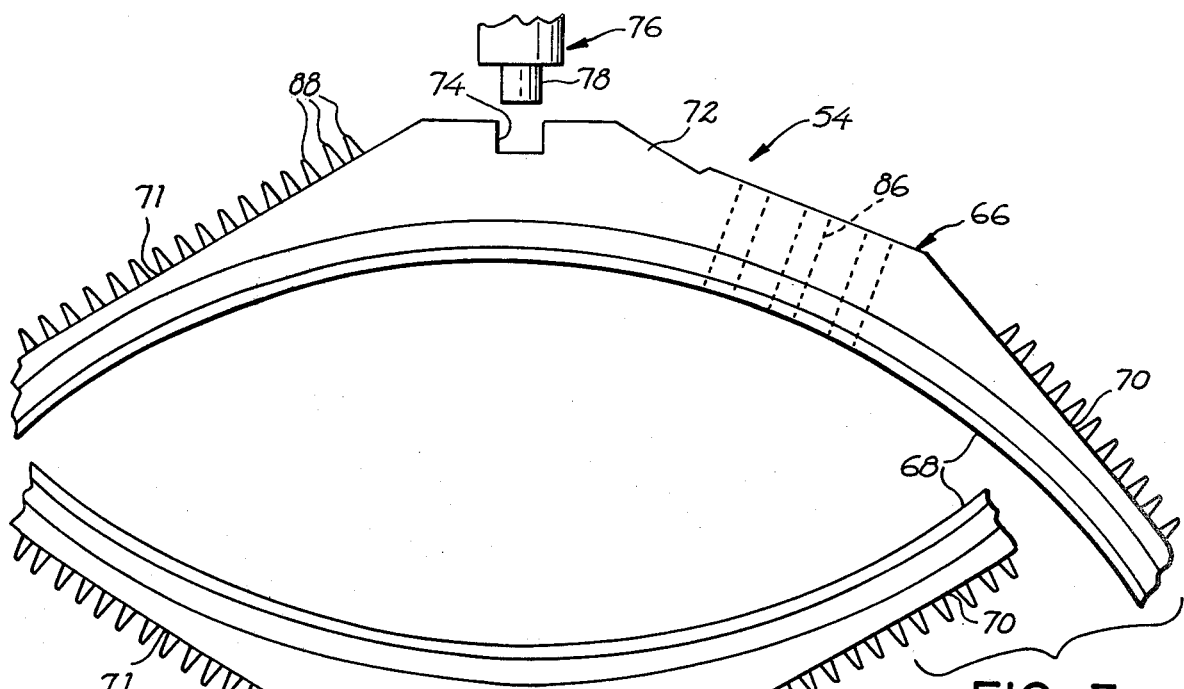
FIG. 3 is a fragmented side view of opposite end regions of a fin-carrying ring structure in the debarker, shown here on a scale slightly reduced from that shown in FIG. 2.

FIG. 1 shows in simplified form, a portion of a log-debarker 10 incorporating a cooling fin system constructed according to the present invention. The debarker conventionally includes a stationary frame 12 and a ring 14 mounted on the frame for powered rotation, in the direction of arrow 16, about a log-transport axis 18. Ring 14 defines a central opening 20 through which a log is moved, substantially along axis 18, in a debarking operation.

Plural debarking arms, such as arms 22, are mounted on the ring, in a conventional manner, for swinging of their inner, or free, ends toward and away from axis 18. Swinging movement of the arms is controlled by pressurized air supplied from the frame to the ring, as will be described below. The debarking arms are also referred to herebelow as air-pressure actuated tools.

Looking now at FIG. 2, and considering first of all conventional construction, frame 12 includes a plate 24 having a central circular opening 26 formed therein. A cylindrical sleeve 28 in the frame is attached as by welding to the plate opening to extend axially to the left therefrom as shown in the figure. Ring 14 is rotatably mounted on the frame by a bearing 30 having inner and outer races 32, 34, respectively. The bearing's outer race is carried on sleeve 28 as shown.

A ring support 36 in ring 14 includes inner and outer annular, axially extending members 38, 40, respectively, joined as by welding by an annular radially extending member 42. The inner race in bearing 30 is mounted on member 38 between a pair of bearing spacers 44, 46. Carried on member 40 is structure used in mounting the debarking arms in the ring, and air-pressure actuated arm-control cylinders (not shown) used in actuating the arms. The arm-mounting structure and control devices are entirely conventional and will not be described here. For purposes of understanding the present invention, it is only necessary to note that pressurized air is supplied to the cylinders through conduits, such as conduit 48, formed in members 38, 42, as shown.

Figure 4:
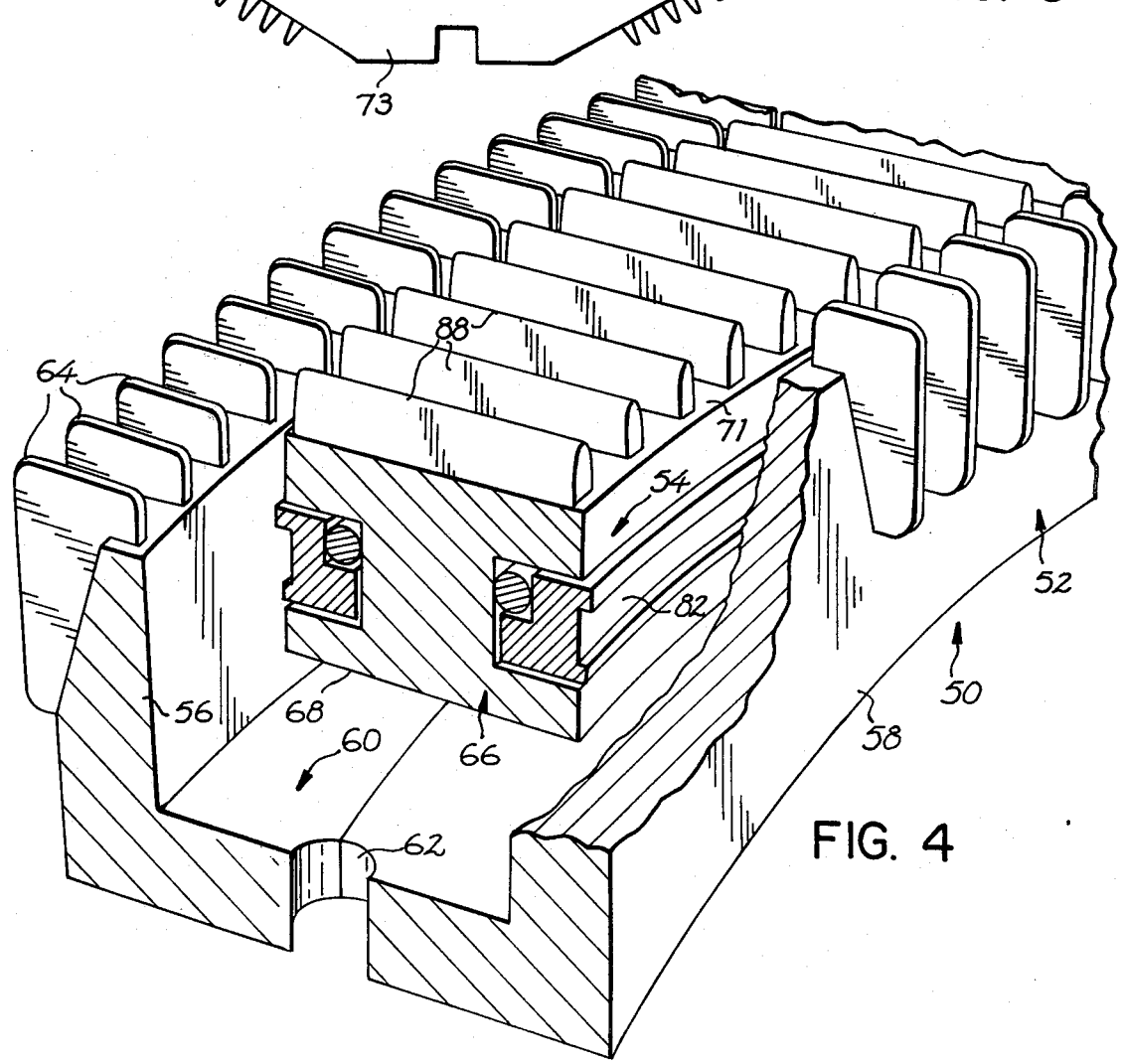
FIG. 4 is a fragmentary perspective view showing details of the fin system of the present invention, shown here on a scale which is enlarged with respect to FIG. 2.

Pressurized air is supplied from frame 12 to the above-mentioned conduits such as conduit 48, through rotary air-seal coupling means including a rotary air seal 50 seen in FIGS. 2 and 4. Seal 50 includes a first, rotatable seal portion 52 mounted on ring 14, and a second, stationary seal portion, on part 54 mounted on frame 12. Seal portion 52 is formed of a pair of axially displaced annular elements 56, 58 having the cross sectional shapes seen in FIG. 2. Elements 56, 58 are mounted on member 38 in the ring between spacer 46 and an annular clamp 59 bolted to member 38 as seen in FIG. 2. Seal part 54 is nested within the outwardly facing groove defined by elements 56, 58, and forms therewith an annular plenum 60 communicating with conduits, such as conduit 48, through associated radially extending bores, such as bore 62, formed in elements 56, 58 and aligned regions of member 38.

According to the present invention, plural cooling fins, such as fins 64 (FIGS. 2 and 4), are joined to each element, such as element 56. The fins are unitary in the associated elements and function, in part, to promote radiative heat transfer from the elements to the surrounding region. The fins are arranged on each element in a circular, planar fin array seen partially in FIG. 4. The circular fin arrays on elements 56, 58 are referred to collectively herein as first fin means.

Seal part 54 includes a ring structure 66 seen in FIGS. 2–4. Structure 66 has a cylindrical inner surface 68 and a pair of substantially semi-cylindrical outer surface regions 70, 71 (FIG. 3) separated by a pair of diametrically opposed enlarged bosses 72, 73 in the structure. Formed in the two bosses are diametrically opposed, axially extending slots, such as slot 74 in boss 72, seen in FIGS. 2 and 3.

Structure 66 is mounted on frame 12 by a pair of diametrically opposed pin assemblies, such as assembly 76 seen in FIGS. 2 and 3, attached to sleeve 28 and bearing against bosses 72, 73 in the structure. Assembly pins, such as pin 78 in FIGS. 2 and 3, are received in associated slots in the structure, such as slot 74, to prevent the structure from rotating.

Plenum 60 is sealed by a pair of annular rings, such as ring 82, received in associated annular grooves formed in opposed sides of structure 66, as seen in FIGS. 2 and 4. Annular sealing surfaces in the two rings are biased conventionally against associated elements 56, 58 by O-rings as shown.

Compressed air is supplied from frame 12 to plenum 60 through plural air supply ports, such as port 86, (FIG. 3) formed in boss 73. Air-supply hoses (not shown) are connected to these ports by suitable fittings. The air-supply passage from the air-supply hoses, through seal 50 and conduits, such as conduit 48, to the arm-control cylinders in the debarker is also referred to herein as air passage means.

Referring particularly to FIGS. 3 and 4, plural cooling fins, such as fins 88, are formed on surface regions 70, 71 in structure 66. These fins are arranged on the two surface regions to form a planar, substantially circular fin array interrupted only at bosses 72, 73. The cooling fins are constructed and arranged on structure 66 to interact with the fin arrays on elements 56, 58 to produce cooling air turbulence in the region of the air seal, when seal elements 56, 58 rotate relative to seal part 54. Fins 88 are also referred to herein as second fin means. These fins, and those on elements 56, 58, collectively form the cooling fin system of the present invention.

It can be appreciated that during the operation of debarker 10, frictional contact between the relatively rotating contact surfaces in seal 50 produces substantial frictional heat in the seal. Heat in elements 56, 58 is transferred via the associated fins to the area surrounding the fins by radiative heat transfer. The fins on part 54 likewise act to dissipate heat. Heat dissipation is enhanced by cooling air turbulence created in the region of the fins as the different arrays of fins rotate relatively past one another. Thus the cooling fin system of the present invention acts to promote heat tranfer away from the rotary seal both by radiative and turbulent-air heat transfer processes.

The cooling fin system of the present invention is easily incorporated into a preexisting log debarker of the general type described herein by replacing the usual debarker seal with a seal having fin arrays joined on the seal parts as described herein.

While a preferred embodiment of the invention has been described above, it is apparent that various changes and modifications can be made without departing from the spirit of the invention.

It is claimed and desired to secure by Letters Patent:

1. In a log debarker having a frame, a ring mounted for rotation on the frame carrying air-pressure-actuated tools, air passage means extending from the frame to the ring for supplying actuating air to the tools, and rotary air-seal-coupling means in the air passage means acting effectively between the frame and ring, including a first seal portion joined to the ring and a second seal portion joined to the frame, a cooling fin system comprising first fin means including multiple fins joined in heat-conducting relation to the first seal portion, and second fin means disposed adjacent said first fin means including multiple fins joined in heat-conducting relation to the second seal portion, said first and second fin means, with rotation of the ring relative to the frame, traveling relatively past one another and cooperating to create cooling air turbulence in the region of the air-seal-coupling means.

2. The system of claim 1, wherein each of said first and second fin means is generally planar and circular and arranged symmetrically relative to the rotational axis of the ring, and said first fin means includes fin portions located on axially opposite sides of the plane of said second fin means.

3. In a log debarker having a frame, a ring mounted for rotation on the frame carrying air-pressure-actuated tools, air passage means extending from the frame to the ring for supplying actuating air to the tools, and air-seal-coupling means in the air passage means acting effectively between the frame and the ring, such coupling means including a rotatable seal portion joined to the ring having a pair of axially displaced annular elements and a stationary annular seal portion joined to the frame, disposed between such elements and having an exposed outer surface, a cooling fin system comprising first fin means including a plurality of angularly spaced fins joined in heat-conducting relation to each of such elements to form a pair of axially spaced, substantially parallel, circular fin arrays, and second fin means including a plurality of fins joined to the outer surface of such stationary seal portion to form a planar, substantially circular fin array disposed between said pair of fin arrays in the first fin means, said first and second fin means, with rotation of the ring relative to the frame, traveling relatively past one another and cooperating to create cooling air turbulence in the region of the air-seal-coupling means.

* * * * *